US006771810B1

(12) United States Patent
Zhang et al.

(10) Patent No.: US 6,771,810 B1
(45) Date of Patent: Aug. 3, 2004

(54) SYSTEM AND METHOD FOR ESTIMATING THE EPIPOLAR GEOMETRY BETWEEN IMAGES

(75) Inventors: Zhengyou Zhang, Redmond, WA (US); Charles T. Loop, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 776 days.

(21) Appl. No.: 09/594,806

(22) Filed: Jun. 16, 2000

(51) Int. Cl.[7] .................................................. G06K 9/00
(52) U.S. Cl. ...................... 382/154; 382/285; 382/294; 345/427; 345/473; 348/42
(58) Field of Search ................................ 382/100, 107, 382/154, 250, 276, 279, 280, 284, 285, 291, 294, 293, 295, 296, 299; 345/419, 420, 426, 427, 473; 348/42, 47

(56) References Cited

U.S. PATENT DOCUMENTS

| | | | | | |
|---|---|---|---|---|---|
| 5,821,943 | A | * | 10/1998 | Shashua | 345/427 |
| 6,516,099 | B1 | * | 2/2003 | Davison et al. | 382/284 |
| 6,614,429 | B1 | * | 9/2003 | Zhang et al. | 345/420 |

OTHER PUBLICATIONS

Adelson, E.H. Perceptual organization and the judgement of brightness. Science, 262:2042–2044, Dec. 24, 1993.
Adelson, E.H. and P. Anandan. Ordinal characteristics of transparency. In AAAI–90 Work. Qualitative Vision, pp. 77–81, 1990.
Baker, S., R. Szeliski, and P. Anandan. A layered approach to stereo reconstruction. In CVPR '98, pp. 434–441, Jun. 1998.
Bergen, J.R., P. Anandan, K.J. Hanna, and R. Hingorani. Hierarchical model–based motion estimation. In ECCV'92, pp. 237–252, Italy, May 1992.
Bergen, J.R., P.J. Burt, R. Hingorani, and S. Peleg. A three–frame algorithm for estimating two–component image motion. IEEE Trans. Patt. Anal. Mach. Intel., 14(9):886–896, Sep. 1992.
Black, M.J., and A. Rangarajan. On the unification of line processes, outlier rejection, and robust statistics with applications in early vision. Intl. J. Comp. Vision, 19(1):57–91, 1996.
Blinn, J.F., Jim Blinn's corner: Compositing, part 1: Theory. IEEE Computer Graphics and Applications, 14(5):83–87, Sep. 1994.
Darrel, T., and E. Simoncelli. "Nulling" filters and the separation of transparent motion. In CVPR '93, pp. 738–739, 1993.
Debevec, P.E., and J. Malik. Recovering high dynamic range radiance maps from photographs. SIGGRAPH '97, pp. 359–378, Aug. 1997.

(List continued on next page.)

Primary Examiner—Timothy M. Johnson
Assistant Examiner—Ali Bayat
(74) Attorney, Agent, or Firm—Lyon & Harr, LLP; Richard T. Lyon

(57) ABSTRACT

The present invention is embodied in a system and method for estimating epipolar geometry, in terms of a fundamental matrix, between multiple images of an object for stereo vision processing. The fundamental matrix embodies the epipolar geometry between the images. In general, the present invention includes a method for estimating epipolar geometry between multiple images of an original space given an initial estimate of the fundamental matrix found using a standard linear estimation technique. Namely, the system and method of the present invention estimates the fundamental matrix by transforming image points of multiple images into projective space. After this transformation is performed, nonlinear optimization is used with one parameterization of the fundamental matrix. The images are then inverse transformed back to the original space with a final estimate of the fundamental matrix. In addition, the original noise information is preserved during the optimization in the projective space.

23 Claims, 5 Drawing Sheets

OTHER PUBLICATIONS

Hsu, P.R., P. Anandan, and S. Peleg. Accurate computation of optical flow by using layered motion representation. In ICPR '94, pp. 743–746, Oct. 1994.

Irani, M., B. Rousso, and S. Peleg. Computing occluding and transparent motion. Int. J. Comp. Vis., 12(1):5–16, Jan. 1994.

Ju, S.X., M.J. Black, and A.D. Jepson. Skin and bones: Multi–layer, locally affine, optical flow and regularization with transparency. In CVPR'96, pp. 307–314, Jun. 1996.

Nayar, S.K., S.X. Fang, and T. Boult. Separation of reflection components using color and polarization. Int. J. Comp. Vis., 21:163–186, 1997.

Sawhney, H.S., and S. Ayer. Compact representations for videos through dominant and multiple motion estimation. *PAMI*, 18(8):814–830, 1996.

Shizawa, M. and K. Mase. A unified computational theory of motion transparency and motion boundaries based on eigenen–ergy analysis. In CVPR'91, pp. 289–295, Jun. 1991.

Shum, H.–Y., and R. Szeliski. Construction and refinement of panoramic mosaics with global and local alignment. In *Sixth International Conference on Computer Vision (ICCV98)*, pp. 953–958, Bombay, Jan. 1998.

Wang, J.Y.A., and E.H. Adelson. Representing moving images with layers. IEEE Trans. Im. Proc., 3(5):625–638, Sep. 1994.

Weiss, Y. Smoothness in layers: Motion segmentation using nonparametric mixture estimation. In *CVPR'97*, pp. 520–526, San Juan, Puerto Rico, Jun. 1997.

* cited by examiner

SYSTEM AND METHOD FOR ESTIMATING THE EPIPOLAR GEOMETRY BETWEEN IMAGES

BACKGROUND OF THE INVENTION

1. Field of the Invention

The present invention relates in general to object modeling, and in particular to a system and method for estimating the epipolar geometry of images representing an object that are used to model the object with image processing systems that require the epipolar geometry for modeling the object.

2. Related Art

Many stereo and computer vision applications that model three dimensional (3D) objects base the 3D modeling on several two dimensional (2D) images and a fundamental matrix that embodies the epipolar geometry between the images. The fundamental matrix is a crucial determination in object modeling.

For example, typically, in these systems, it is assumed that at least a pair of two dimensional images of the three dimensional object or environment are taken from two distinct viewpoints. In operation, these system usually first obtain two-dimensional images of a three-dimensional object and then obtain a fundamental matrix between the two images. In other words, the epipolar geometry of the two images is usually determined first and corresponding points between the two images typically need to satisfy an epipolar constraint before performing additional steps for modeling the object.

Current systems that perform estimation of the fundamental matrix typically require consideration of 36 distinct parameterizations. These distinct 36 parameterizations are considered because an epipole may be at infinity and an element of the epipolar transformation may be equal to 0, thus, requiring 36 maps to parameterize the fundamental matrix. However, these systems are time consuming and lead to cumbersome implementation of optimization procedures.

Therefore, what is needed is a system and method for estimating the fundamental matrix without using 36 maps to parameterize the fundamental matrix. What is also needed is a system and method for transforming image points of the image in projective space, so that nonlinear optimization is performed with one parameterization of the fundamental matrix. What is further needed is a system and method for estimating the fundamental matrix that preserves the characteristics of the data noise model from the original image space.

SUMMARY OF THE INVENTION

To overcome the limitations in the prior art described above, and to overcome other limitations that will become apparent upon reading and understanding the present specification, the present invention is embodied in a system and method for estimating epipolar geometry, in terms of a fundamental matrix, between multiple images for stereo vision processing. The fundamental matrix embodies the epipolar geometry between the images.

In general, the present invention includes a method for estimating epipolar geometry between multiple images of an original space given an initial estimate of the fundamental matrix found using a standard linear estimation technique. Namely, the system and method of the present invention estimates the fundamental matrix by transforming image points of multiple images into projective space. After this transformation is performed, nonlinear optimization is used with one parameterization of the fundamental matrix, rather than considering 36 distinct parameterizations, as in previous methods. The images are then inverse transformed back to the original space with a final estimate of the fundamental matrix.

Specifically, one method of the present invention involves first identifying an element of the fundamental matrix with the largest absolute value. Second, two appropriate permutation matrices (projective transformations) of the image points are constructed such that the element with the largest absolute value of the fundamental matrix is at location (0,0) of the matrix. Third, the coordinates of each image point are permuted accordingly. Fourth, the fundamental matrix in the permutated space is estimated using a non-linear estimation technique. Last, an inverse permutation is performed to the estimated fundamental matrix of the original space. In addition, the present invention includes a method for preserving the characteristics of a data noise model from the original image space.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Exemplary Operating Environment

Figure 1:
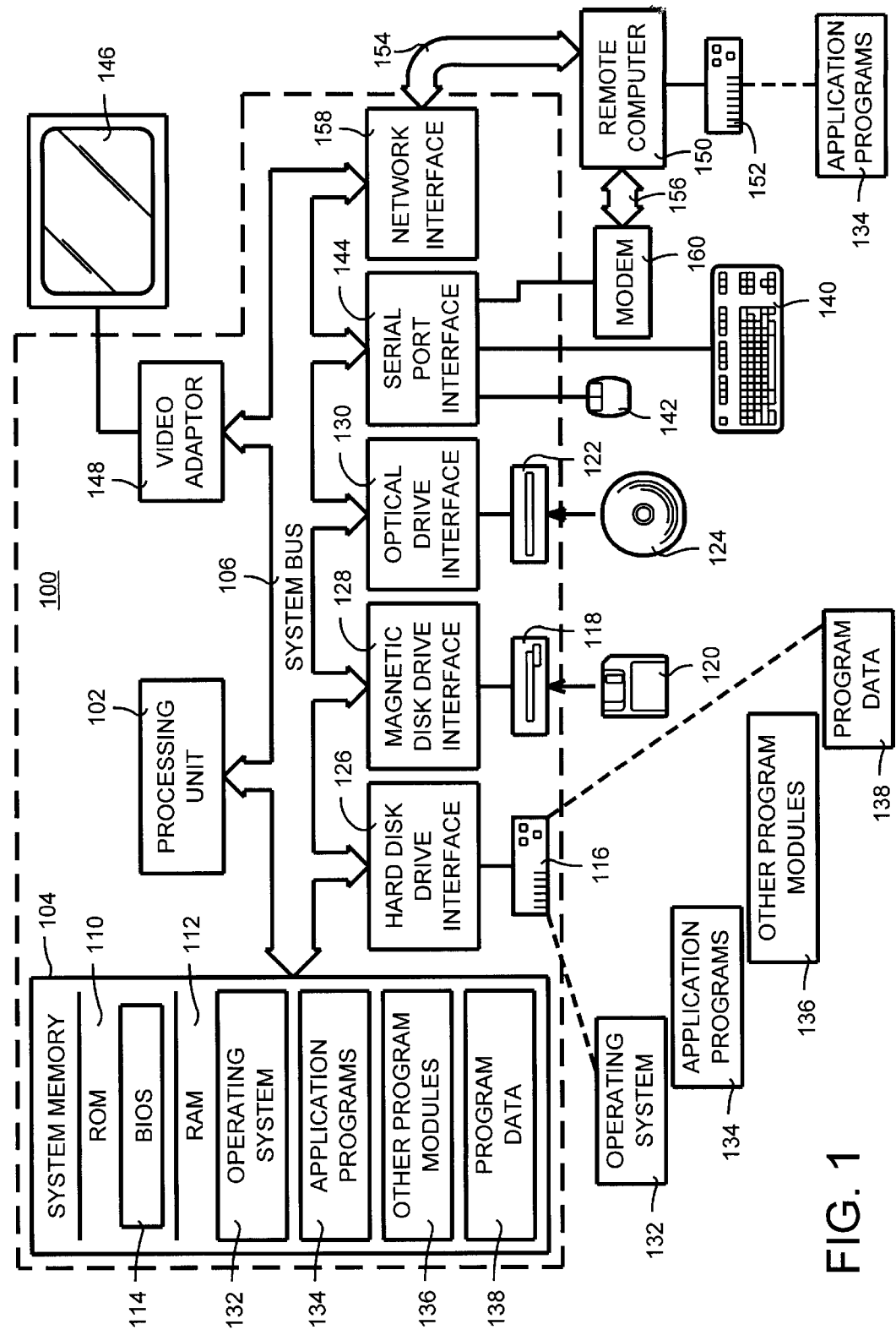
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

II. General Overview

Figure 2:
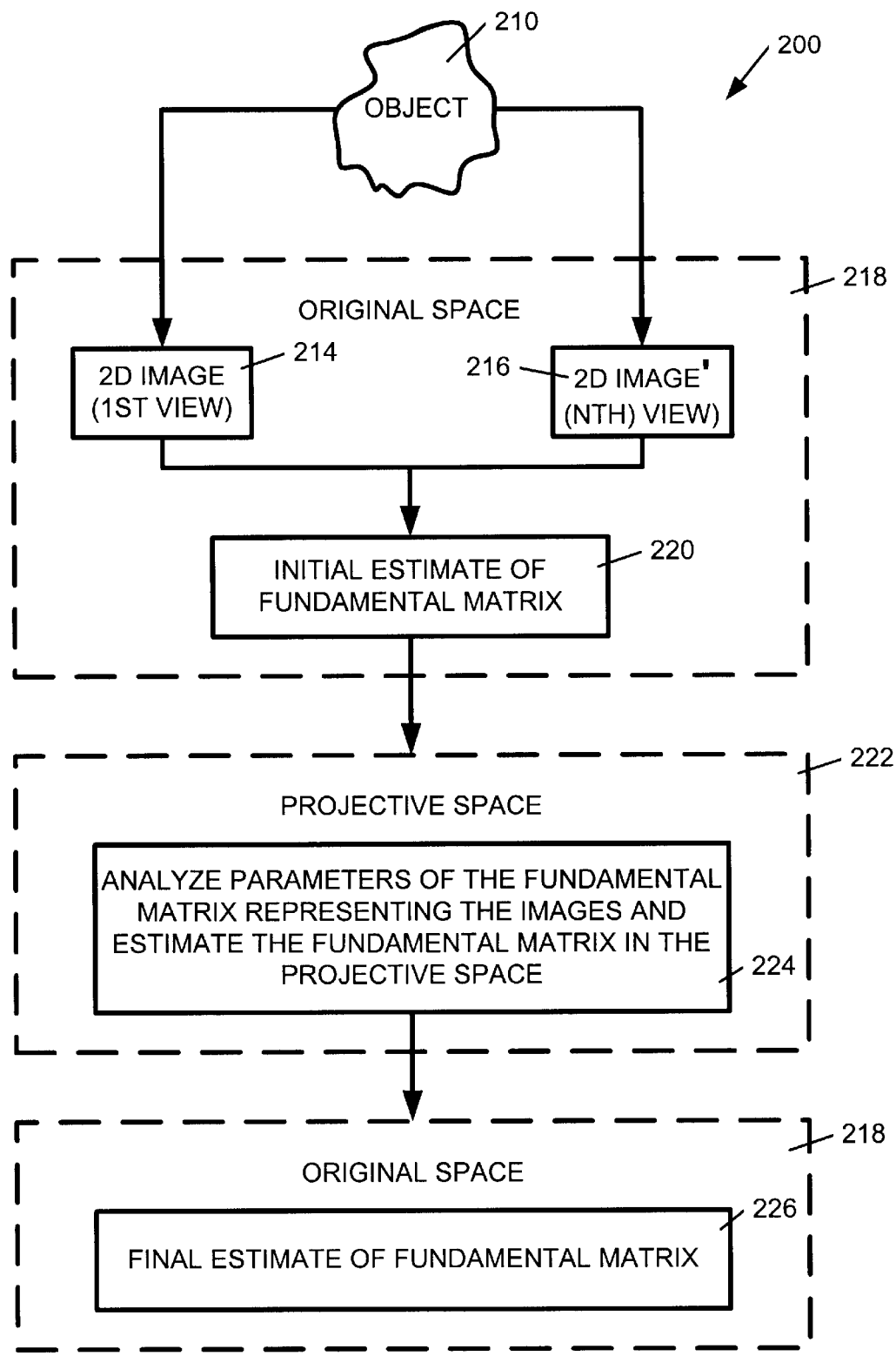
FIG. 2 is an overview block diagram of the present invention.

FIG. 2 is an overview block diagram of the present invention. The present invention is embodied in a system and method 200 for estimating the epipolar geometry, in terms of a fundamental matrix, between images representing an object 210 for stereo vision processing and 3D modeling of the object 210. The fundamental matrix is a geometrical representation that embodies the epipolar geometry between the images, which is preferably more than one two-dimensional (2D) image representing the object 210. For example, a first view 214 up to an Nth view 216 can be used to represent the object 210.

In general, the first view 214 and the Nth view 216 of the respective images represent the object 210 in original space 218. An initial estimate 220 of the fundamental matrix between the images is predefined, assumed or obtained by any suitable means. Respective image points of the images 214, 216 are then transformed into projective space 222. After this transform, parameters of the fundamental matrix representing the images are analyzed 224 for estimating the fundamental matrix in the projective space 222.

Suitable analysis in accordance with the present invention is performed, such as nonlinear optimization. Only one parameterization of the fundamental matrix needs to be considered, rather than consideration of 36 distinct parameterizations, as in previous systems discussed above. Further, the present invention preserves the characteristics of a data noise model from the original image space. Last, the images 214, 216 are inverse transformed back to the original space and a final estimate of the fundamental matrix 226 is produced in the original space 218.

III. Details of the Components and Operation

Figure 3:
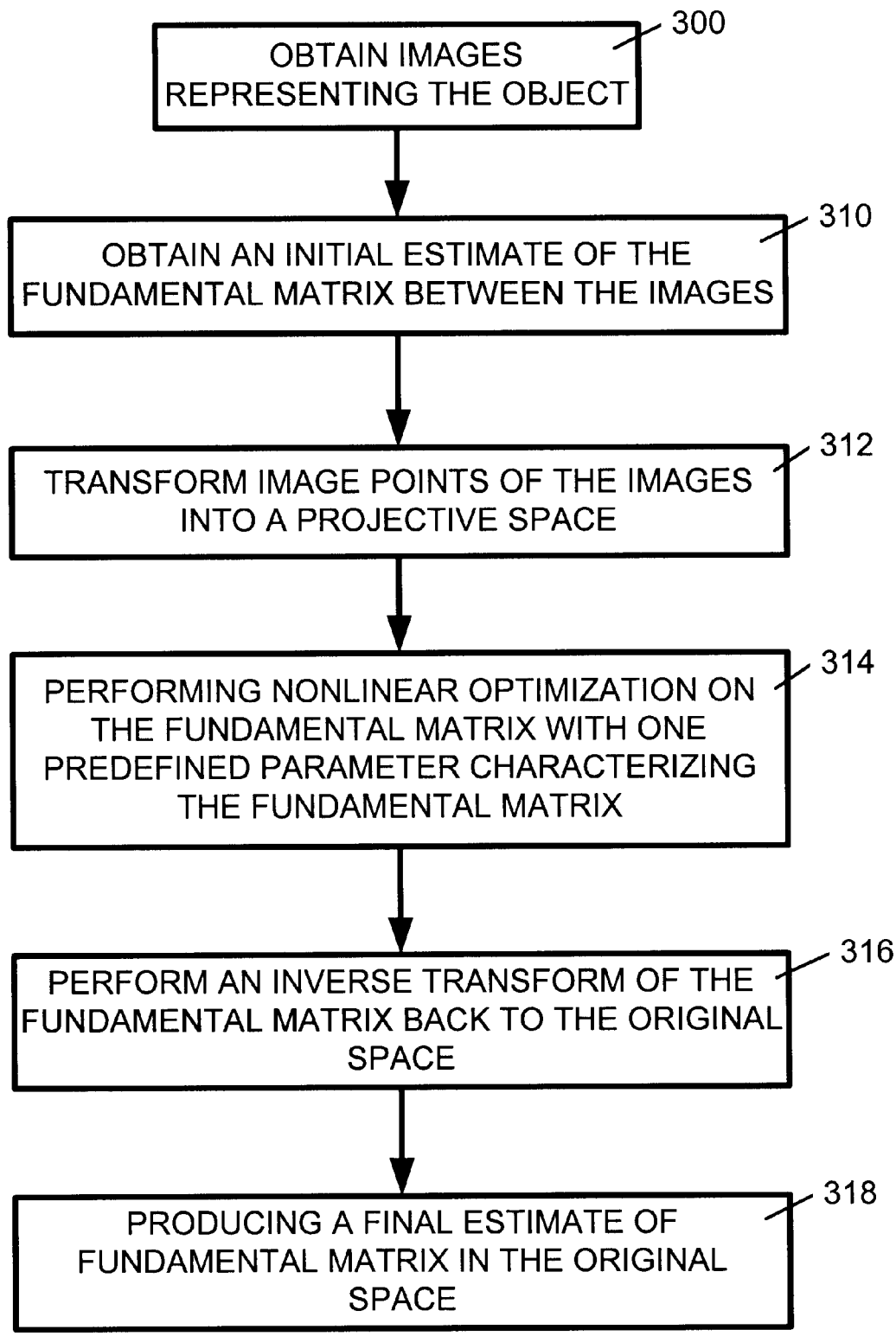
FIG. 3 shows the operational and functional flow of the present invention.

FIG. 3 shows the operational and functional flow of the present invention. Referring to FIG. 2 along with FIG. 3, in general, first the images 214, 216 representing the object 210 are obtained (step 300). The images 214, 216 are preferably 2D views of the object 210 at appropriate locations that preferably depict all or most of the unique features or characteristics of the object 210. Second, an initial estimate of the fundamental matrix 220 between the images 214, 216 is made (step 310). Third, respective image points of the images 214, 216 are transformed from the original space 218 to the projective space 222 (step 312).

Next, parameters of the fundamental matrix representing the images are analyzed 224 for estimating the fundamental matrix in the projective space 222, as shown in FIG. 2. This can be accomplished, for example, by performing nonlinear optimization on the fundamental matrix with one predefined parameter characterizing the fundamental matrix (step 314), unlike other methods, which require all 36 parameters. Fifth, an inverse transform of the fundamental matrix is performed for transforming the images 214, 216 back to the original space 218 (step 316). From these steps of FIG. 3, a final estimate of fundamental matrix in the original space (step 318) is produced.

A. Parameterization of the Fundamental Matrix

The discussion below of this section and sections B. and C. is for providing a better understanding of the parameterization of the fundamental matrix. The fundamental matrix embodies the epipolar geometry between the images 214, 216. Referring to the method described above and shown in FIG. 3, along with FIG. 4, the epipolar geometry exists between the camera systems that produce the images 214, 216 representing the object 210.

Figure 4:
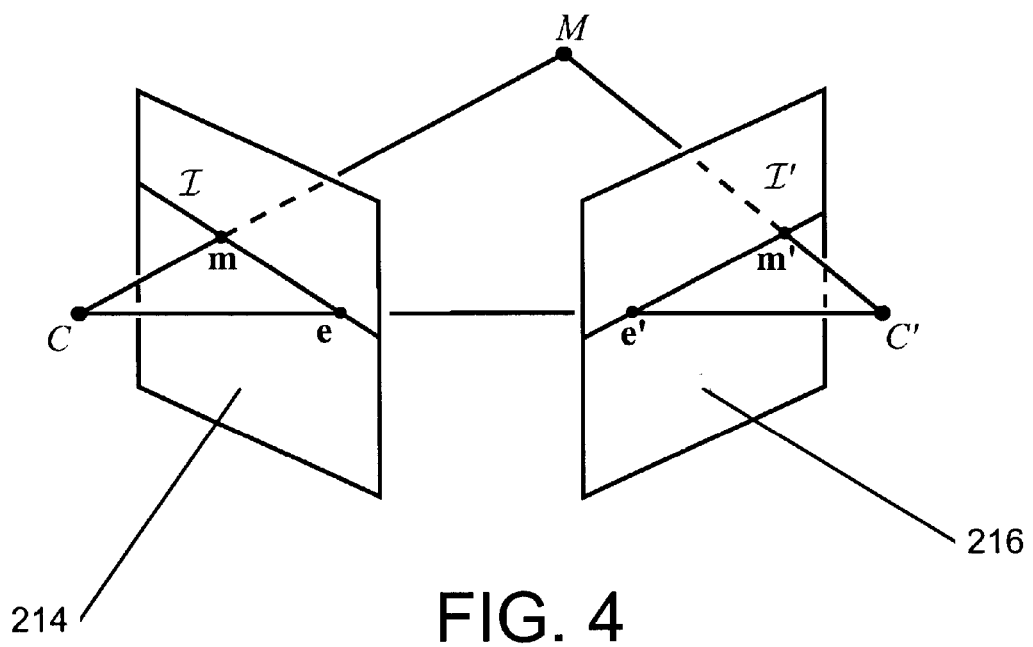
FIG. 4 illustrates the epipolar geometry of the multiple views of the present invention.

For example, the epipolar geometry between a pair of images can be defined by setting C and C' as a pair of pinhole cameras in 3D space and letting m and m' be the projections through cameras C and C' of a 3D point M in images I and I' respectively, as shown in FIG. 4. For point m, in the first image 214, the correspondence in the Nth or second image 216, $m'_i$, lies on an epipolar line in the second image. This epipolar line is the projection of the semi-line Cm onto the second image. This is commonly referred to as the epipolar constraint.

Algebraically, in order for $m_i$ and $m'_i$ to be matched, the following equation must be satisfied:

$$\tilde{m}'_i{}^T F \tilde{m}_i = 0, \tag{1}$$

where F, is referred to as the fundamental matrix. The fundamental matrix is a 3×3 matrix of rank 2 (i.e., det(F)=0), defined up to a scale factor, where $\tilde{m}_i$ and $\tilde{m}'_i$ are homogeneous coordinates of points $m_i$ and $m'_i$, i.e., $\tilde{m}_i=[m_i{}^T,1]^T$ and $\tilde{m}'_i=[m'_i{}^T,1]^T$. The fundamental matrix F maps points in I to lines in I', and points in I' to lines in I'. That is, if m is a point in I, then Fm=l' is an epipolar line in I'. In fact, any point m' that corresponds with m lies on the epipolar line. For a fundamental matrix F, there exists a pair of unique points e∈I and e'∈I'.

The points e and e' are the epipoles of images I and I' respectively. The epipoles have the property that all epipolar lines in I pass through e. Similarly all epipolar lines in I' pass through e'. In 3D space, e and e' are the intersections of the line CC' with the planes containing image I and I'. The set of planes containing the line CC' are the epipolar planes. Any 3D point M not on line CC' will define an epipolar plane, the intersection of this epipolar plane with the plane containing I or I' will result in an epipolar line, as shown in FIG. 4. Additional epipolar geometrical formulations are described in "Determining the Epipolar Geometry and its Uncertainty: A Review," by Z. Zhang, *International Journal of Computer Vision*, 27(2):161–1195, 1998, which is incorporated herein by reference.

B. Parameterization Based on the Epipolar Transformation

There are several possible parameterizations for the fundamental matrix. Namely, one row (or column) of the fundamental matrix can be expressed as the linear combination of the other two rows (or columns). One possibility is the following:

$$F = \begin{bmatrix} a & b & -ax - by \\ c & d & -cx - dy \\ -ax' - cy' & -bx' - dy' & F_{33} \end{bmatrix} \tag{2}$$

with $F_{33}=(ax+by)x'+(cx+dy)y'$.

In this case, x and y are the coordinates of the first epipole, x' and y' are the coordinates of the second epipole, and a,b,c and d, defined up to a scale factor, parameterize the epipolar transformation mapping an epipolar line in the first image 214 to its corresponding epipolar line in the second image 216.

However, this parameterization does not work if an epipole is at infinity. This is because at least one of x,y,x' and y' has value of infinity. In order to overcome this problem, methods have been proposed to use in total 36 maps to parameterize the fundamental matrix, as summarized below.

C. 36 Maps to Parameterize the Fundamental Matrix

For definitional purposes, the columns of F are denoted by the vectors $c_1$, $c_2$ and $c_3$. The rank-2 constraint on F is equivalent to the following two conditions:

$$\exists \lambda_1, \lambda_2 \text{ such that } c_{j_0}+\lambda_1 c_{j_1}+\lambda_2 c_{j_2}=0 \tag{3}$$

$$\text{not } \exists \lambda \text{ such that } c_{j_1}+\lambda c_{j_2}=0 \tag{4}$$

for $j_0$, $j_1$, $j_2 \in \{1, 2, 3\}$, where $\lambda_1$, $\lambda_2$ and $\lambda$ are scalars. Condition (4), as a non-existence condition, cannot be expressed by parameterization. As such, condition (3) is kept and the parameterized set is extended to all the 3×3 matrices of rank strictly less than 3. Hence, the rank-2 matrices of, for example, the following forms:

$$[c_1 c_2 \lambda c_2] \text{ and } [c_1 0_3 c_3] \text{ and } [c_1 c_2 0_3]$$

do not have any parameterization if $j_0=1$ is taken. A parameterization of F is then given by $(c_{j_1}, c_{j_2}, \lambda_1, \lambda_2)$. This parameterization implies to divide the parameterized set among three maps, corresponding to $j_0=1$, $j_0=2$ and $j_0=3$.

If 3-vector is constructed such that $\lambda_1$ and $\lambda_2$ are the $j_1^{th}$ and $j_2^{th}$ coordinates and 1 is the $j_0^{th}$ coordinate, it follows that this vector is the eigenvector of F, and is thus, the epipole in the case of the fundamental matrix. Using such parameterization implies to compute directly the epipole which is often a useful quantity, instead of the matrix itself.

To make the above symmetrical and since the epipole in the other image 216 is desirable, the same decomposition used for the columns is used for the rows, which now divides the parameterized set into 9 maps, corresponding to the choice of column and row as linear combinations of the two columns and two rows left. A parameterization of the matrix is then formed by the two coordinates x and y of the first epipole, the two coordinates x' and y' of the second epipole and the four elements a, b, c and d left by $c_{i_1}$, $c_{i_2}$, $1_{j_1}$ and $1_{j_2}$, which in turn parameterize the epipolar transformation mapping an epipolar line of the first image 214 to its corresponding epipolar line in the second image 216. The parameterization shown in (2) corresponds to the case $i_0=3$ and $j_0=3$.

Finally, to take into account the fact that the fundamental matrix is defined only up to a scale factor, the matrix is normalized by dividing the four elements (a, b, c, d) by the largest in absolute value. Therefore, a total of 36 maps to parameterize the fundamental matrix exists.

D. Detailed Operation for Estimating the Fundamental Matrix

The present invention is embodied in a procedure for estimating the fundamental matrix for multiple images taken from distinct viewpoints of a 3D scene without considering all 36 distinct parameterizations. As a result, the present invention models the three-dimensional (3D) object 210 with two-dimensional (2D) images 214, 216, without the burden of implementing a system that considers all 36 parameterizations.

Figure 5:
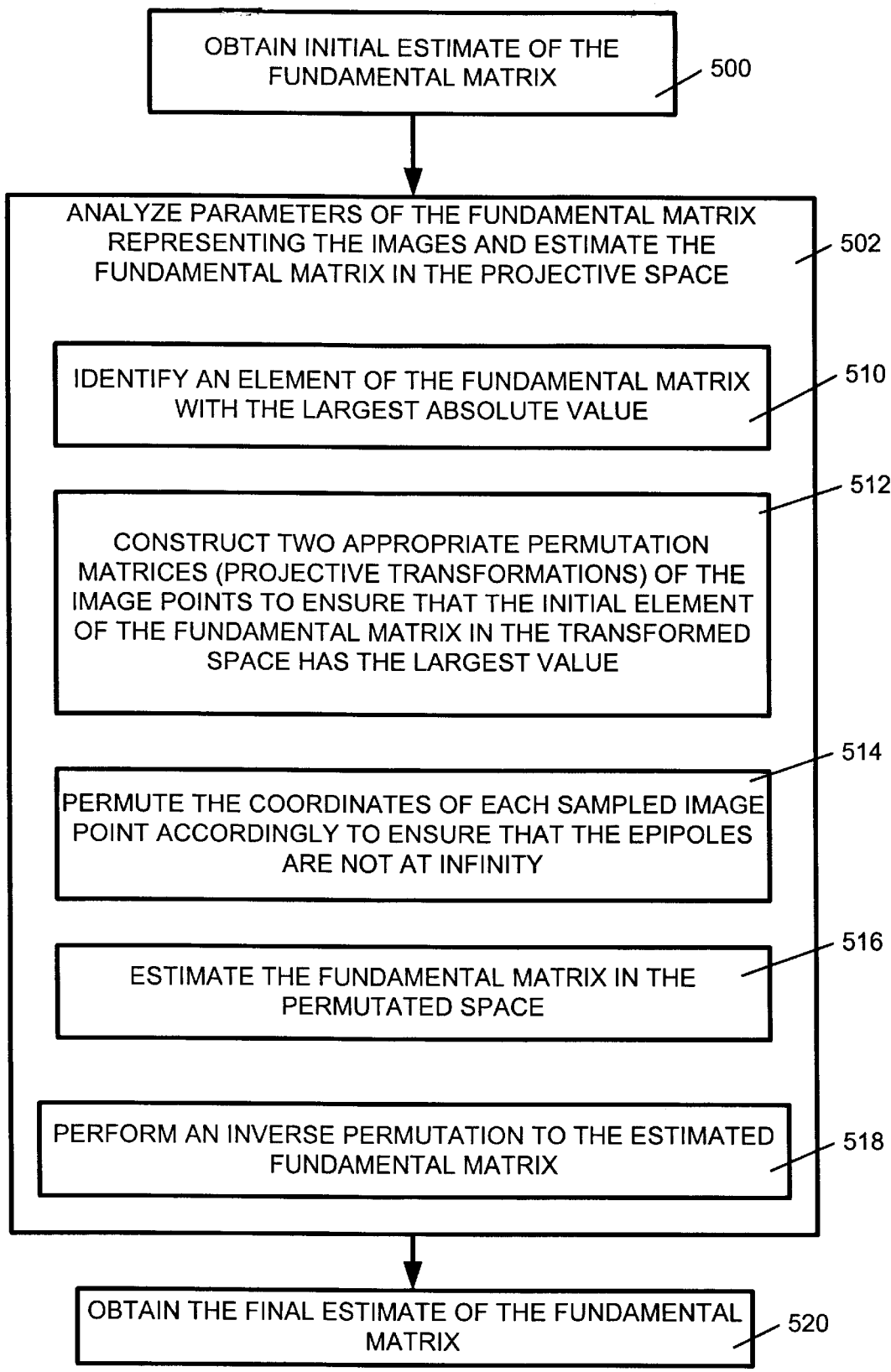
FIG. 5 is a detailed flow diagram of the analysis for the fundamental matrix in projective space as described in FIG. 2.

FIG. 5 is a detailed flow diagram of the analysis of element 224 for the fundamental matrix in projective space as described in FIG. 2. In general, for analyzing the parameters of the fundamental matrix (step 502), first, after an initial estimate of the fundamental matrix is obtained (step 500), an element of the fundamental matrix with the largest absolute value is identified (step 510). Second, two appropriate permutation matrices (projective transformations) of image points, one for each image, are constructed such that the element with the largest absolute value of the fundamental matrix is at location (0,0) of the matrix (step 512). This ensures that the initial element of the fundamental matrix in the transformed space has the largest value.

Next, the coordinates of each image point are permuted accordingly (step 514). This ensures that the epipoles are not at infinity. Fourth, the fundamental matrix in the permutated space is estimated using a non-linear estimation technique (step 516). Last, an inverse permutation is performed to the estimated fundamental matrix of the original space (518) to obtain the final estimate of the fundamental matrix (step 520).

More specifically, the present invention transforms the image points of the images 214, 216 of the object 210 of FIG. 2 in projective space and then analyzes the initial estimate of the fundamental matrix. As a result, the present invention does not need to work with all 36 distinct parameterizations, but instead uses one parameterization, such as equation (2), while ensuring that the value of a is largest, so a=1 can be defined.

Namely, the present invention finds the projective transformation in each image, denoted by P and P', such that the first element in the transformed image space of the fundamental matrix has the largest value and the epipoles are not at infinity. For instance, let the image points in the transformed space be $$\tilde{m}_i = P\tilde{m}_i \text{ and } \tilde{m}'_i = P'\tilde{m}_i, \tag{5}$$

then the fundamental matrix in the transformed space is given by $$\tilde{F} = P'^{-T} F P^{-1}. \tag{6}$$

Given an initial estimate of matrix $F_0$ obtained for example with Hartley's normalized 8-point algorithm, as described in: "In defence of the 8-point algorithm," by R. I. Hartley, *In Proceedings of the 5th International Conference on Computer Vision*, pages 1064–1070, Boston, Mass., June 1995, IEEE Computer Society Press, and incorporated herein by reference, the epipoles $\tilde{e}_0$ and $\tilde{e}'_0$ are computed. The matrices P and P' are 3×3 permutation matrices determined as follows: First, P and P' are initialized to be identity matrices; second, the position of the largest element of $F_0$, is found, denoted by $(i_0, j_0)$ (Index of vector or a matrix starts with 0); third, if $j_0 \neq 0$, rows 0 and $j_0$ of matrix P are permuted and elements 0 and $j_0$ of epipole $\tilde{e}_0$ are permuted; fourth if $i_0 \neq 0$, rows 0 and $i_0$ of matrix P' are permuted and elements 0 and $i_0$ of epipole $\tilde{e}'_0$ are permuted; fifth if $|\tilde{e}_0[1]| > |\tilde{e}_0[2]|$, elements 1 and 2 of epipole $\tilde{e}_0$ are permuted and rows 1 and 2 of matrix P are permuted; and last, if $|\tilde{e}'_0[1]| > |\tilde{e}'_0[2]|$, then elements 1 and 2 of epipole $\tilde{e}'_0$ are permuted and rows 1 and 2 of matrix P' are permuted.

The third and fourth steps ensure that the first element of the fundamental matrix in the transformed space has the largest value, while the fifth and sixth steps ensure that the epipoles are not at infinity. It should be noted that $P^{-1} = P^T$ and $P'^{-1} = P'^T$ because they are permutation matrices. A detailed explanation for efficiently representing permutation matrix with an integer vector is described in "Matrix Computations," by G. H. Golub and C. F. van Loan, The John Hopkins University Press, Baltimore, Md., 3 edition, 1996, which is incorporated herein by reference. The parameterization of equation (2) can now be used to estimate $\hat{F}$ from the transformed image points $\tilde{m}_i$ and $\tilde{m}'_i$. The fundamental matrix in the original image space is given by $F = P'^T \hat{F} P$.

E. Preserving Information of the Original Noise Distribution

In addition, the present invention includes a method for preserving the characteristics of a data noise model from the original image space. In the present invention, points are detected in the original image space. All nonlinear optimization criteria are derived from the noise distribution of these points. One reasonable assumption is that the image points are corrupted by independent and identically distributed Gaussian noise with mean zero and covariance matrices given by $$\Lambda_{m_i} = \Lambda_{m'_i} = \sigma^2 \text{diag}(1,1), \tag{7}$$

where $\sigma$ is the noise level, which is usually unknown. This assumption is clearly no longer reasonable in the transformed image space. In the following description, it is shown how to estimate the transformed fundamental matrix while preserving information of the original noise distribution, which will be illustrated using the gradient-weighted criterion.

From equations (1), (5) and (6), it can be seen that the transformed fundamental matrix and the original image points are related by $$f_i = \tilde{m}'^T_i P'^T \hat{F} P \tilde{m}_i = 0. \tag{8}$$

The least-squares technique produces an optimal solution if each term has the same variance. Therefore, the transformed fundamental matrix can be estimated by minimizing the following weighted sum of squares (the chi-square $\chi^2$):

$$\min_{\hat{F}} \sum_i f_i^2 / \sigma_{f_i}^2, \qquad (9)$$

where $\sigma_{f_i}$ is the variance of $f_i$, and its computation is given below. The following notation is defined:

$$Z = \text{diag}(1,1,0),$$

From equation (7), the covariances of the homogeneous coordinates of the image points are given by $$\Lambda_{\tilde{m}_i} = \Lambda_{\tilde{m}'_i} = \sigma^2 Z, \qquad (10)$$

Under first order approximation, the variance of $f_i$ is then given by $$\sigma_{f_i}^2 = \left(\frac{\partial f_i}{\partial \tilde{m}_i}\right)^T \Lambda_{\tilde{m}_i} \frac{\partial f_i}{\partial \tilde{m}_i} + \left(\frac{\partial f_i}{\partial \tilde{m}'_i}\right)^T \Lambda_{\tilde{m}'_i} \frac{\partial f_i}{\partial \tilde{m}'_i}$$

$$= \sigma^2 (\hat{l}_i^T P Z P^T \hat{l}_i + \hat{l}'^T_i P' Z P'^T \hat{l}'_i)$$

where $\hat{l}'_i = \hat{F}\tilde{m}_i$ and $\hat{l}_i = \hat{F}^T\tilde{m}'_i$ are epipolar lines in the transformed image space. Since multiplying each term by a constant does not affect the minimization, the expression in (9) becomes $$\min_{\hat{F}} \sum_i \frac{(\tilde{m}'^T_i \hat{F}\tilde{m}_i)^2}{\hat{l}_i^T P Z P^T \hat{l}_i + \hat{l}'^T_i P' Z P'^T \hat{l}'_i}. \qquad (11)$$

The denominator is simply the gradient of $f_i$. The minimization can be conducted by any suitable technique, such as the Levenberg-Marquardt technique.

IV. Conclusion

In conclusion, the present invention estimates the fundamental matrix of multiple images of an original space given an initial estimate of the fundamental matrix found using a standard linear estimation technique. Namely, the fundamental matrix is estimated by transforming image points of multiple images into projective space. After this transformation is performed, nonlinear optimization is used with one parameterization of the fundamental matrix, rather than considering 36 distinct parameterizations, as in previous methods. The images are then inverse transformed back to the original space with a final estimate of the fundamental matrix. In addition, the present invention includes a method for preserving the characteristics of a data noise model from the original image space.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for estimating epipolar geometry between at least two images of an original space given an initial estimate of a fundamental matrix, comprising:

transforming image points of the two images into a projective space;

performing nonlinear optimization on the fundamental matrix with at least one predefined parameter characterizing the fundamental matrix; and performing an inverse transform of the fundamental matrix back to the original space.

2. The method of claim 1, further comprising preserving the characteristics of a data noise model from the original image space.

3. The method of claim 1, wherein transforming the image points into the projective space is performed such that the first element of the fundamental matrix in the transformed image space has the largest value and the epipoles are not at infinity.

4. The method of claim 1, further comprising constructing two appropriate permutation matrices of the image points.

5. The method of claim 4, wherein constructing two appropriate permutation matrices ensures that the initial element of the fundamental matrix in the transformed space has the largest value.

6. The method of claim 4, wherein the two appropriate permutation matrices are projective transformations.

7. The method of claim 4, wherein the projective transformations are initialized to be identity matrices.

8. The method of claim 1, further comprising detecting the image points in the original image space.

9. The method of claim 8, wherein nonlinear optimization criteria are derived from the noise distribution of the image points.

10. A method for estimating epipolar geometry between two images of an original space given an initial estimate of a fundamental matrix, comprising:

identifying an element of the fundamental matrix with the largest absolute value;

ensuring that the initial element of the fundamental matrix in the transformed space has the largest value;

ensuring that the epipoles are not at infinity;

estimating the fundamental matrix in the permutated space; and performing an inverse permutation to the estimated fundamental matrix to obtain the fundamental matrix of the original image space.

11. The method of claim 10, wherein ensuring that the initial element of the fundamental matrix in the transformed space has the largest value includes permuting the image coordinates.

12. The method of claim 11, wherein two permutation matrices of image points are constructed such that the element with the largest absolute value is at an initial position of the fundamental matrix.

13. The method of claim 12, wherein the two permutation matrices are projective transformations.

14. The method of claim 13, wherein the projective transformations are initialized to be identity matrices.

15. The method of claim 10, wherein ensuring that the epipoles are not at infinity includes permuting coordinates of each image point.

16. A method for estimating epipolar geometry between two images of an original space given an initial estimate of a fundamental matrix, comprising:

identifying an element of the fundamental matrix with the largest absolute value;

constructing two appropriate permutation matrices of image points such that the element with the largest absolute value of the fundamental matrix is at an initial location of the matrix;

permuting the coordinates of each sampled image point accordingly;

estimating the fundamental matrix in the permutated space; and performing an inverse permutation to the estimated fundamental matrix to obtain the fundamental matrix of the original image space.

17. The method of claim 16, further comprising transforming the image points into a projective space.

18. The method of claim 17, wherein transforming the image is performed such that the first element in the transformed image space of the fundamental matrix has the largest value and the epipoles are not at infinity.

19. The method of claim 16, further comprising performing nonlinear optimization on the fundamental matrix with at least one predefined parameter characterizing the fundamental matrix.

20. The method of claim 19, further comprising detecting the image points in the original image space.

21. The method of claim 20, wherein nonlinear optimization criteria are derived from the noise distribution of the image points.

22. The method of claim 16, wherein the two permutation matrices are projective transformations.

23. The method of claim 22, wherein the projective transformations are initialized to be identity matrices.

* * * * *